United States Patent
Hayashi et al.

(10) Patent No.: US 10,822,456 B2
(45) Date of Patent: Nov. 3, 2020

(54) AZIDE GROUP-CONTAINING FLUOROPOLYMERS AND METHOD FOR PREPARING THE SAME

(71) Applicant: Shin-Etsu Chemical Co., Ltd., Tokyo (JP)

(72) Inventors: Ryuto Hayashi, Annaka (JP); Kenichi Fukuda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 114 days.

(21) Appl. No.: 16/197,930

(22) Filed: Nov. 21, 2018

(65) Prior Publication Data

US 2019/0169369 A1    Jun. 6, 2019

(30) Foreign Application Priority Data

Dec. 4, 2017    (JP) .................................. 2017-232578

(51) Int. Cl.
| | |
|---|---|
| *C08G 65/338* | (2006.01) |
| *C08G 65/22* | (2006.01) |
| *C08G 65/325* | (2006.01) |
| *C08G 65/00* | (2006.01) |

(52) U.S. Cl.
CPC ......... *C08G 65/338* (2013.01); *C08G 65/007* (2013.01); *C08G 65/226* (2013.01); *C08G 65/325* (2013.01)

(58) Field of Classification Search
CPC ............................ C08G 65/007; C08G 65/226
See application file for complete search history.

(56) References Cited

U.S. PATENT DOCUMENTS

| | | | |
|---|---|---|---|
| 5,399,758 A | * | 3/1995 | Miura ................... C07C 243/28 564/148 |
| 7,691,515 B2 | | 4/2010 | Li et al. |
| 8,143,359 B2 | | 3/2012 | Koike et al. |
| 8,247,614 B2 | | 8/2012 | Hung et al. |
| 8,865,820 B2 | | 10/2014 | Matsuda et al. |
| 9,388,257 B2 | * | 7/2016 | Hintzer ..................... C08F 4/00 |
| 2010/0324234 A1 | * | 12/2010 | Hung ..................... C08G 73/08 526/90 |
| 2012/0028858 A1 | * | 2/2012 | Wadgaonkar ........ C08G 65/325 508/279 |

(Continued)

FOREIGN PATENT DOCUMENTS

| | | |
|---|---|---|
| JP | 2008-522014 A | 6/2008 |
| JP | 2012-500322 A | 1/2012 |

(Continued)

OTHER PUBLICATIONS

Yang et al. J. Mater. Chem., 2012, 22, 1100. "Clicked" fluoropolymer elastomers as robust materials for potential microfluidic device applications. DOI: 10.1039/c1jm14131g (Year: 2011).*

(Continued)

*Primary Examiner* — Michael M Dollinger
(74) *Attorney, Agent, or Firm* — Birch, Stewart, Kolasch & Birch, LLP

(57) ABSTRACT

An azide group-containing fluoropolymer of formula (1) having a perfluoropolyether group of specific molecular structure as the backbone and terminated with an azide group via methylene group is provided.

$$N_3-CH_2-Rf^1-CH_2-N_3 \quad (1)$$

2 Claims, 3 Drawing Sheets

(56) References Cited

U.S. PATENT DOCUMENTS

2015/0259450 A1* 9/2015 Corveleyn ........... C08G 18/807
                                                524/850
2018/0186934 A1* 7/2018 Charlas ............... C08G 65/007

FOREIGN PATENT DOCUMENTS

| JP | 5246190 B2 | 7/2013 |
| JP | 5356129 B2 | 12/2013 |
| JP | 5635084 B2 | 12/2014 |

OTHER PUBLICATIONS

Kysilka et al., "HFPO Trimer-Based Alkyl Triflate, A Novel Buildng Block for Fluorous Chemistry. Preparation, Reactions and $^{19}$F gCOSY Analysis", Collect. Czech. Chem. Commun., 2008, vol. 73, No. 12, pp. 1799-1813.

* cited by examiner

AZIDE GROUP-CONTAINING FLUOROPOLYMERS AND METHOD FOR PREPARING THE SAME

CROSS-REFERENCE TO RELATED APPLICATION

This non-provisional application claims priority under 35 U.S.C. § 119(a) on Patent Application No. 2017-232578 filed in Japan on Dec. 4, 2017, the entire contents of which are hereby incorporated by reference.

TECHNICAL FIELD

This invention relates to novel azide group-containing fluoropolymers. More particularly, it relates to an azide group-containing fluoropolymer containing a divalent perfluoropolyether group of specific molecular structure having an azide group bonded at both ends of the molecular chain via methylene, the fluoropolymer being free of an organic substituent on the methylene.

BACKGROUND ART

Fluorinated polymers such as perfluoropolyether based elastomers are amenable to any terminal modifications by subjecting them to suitable chemical reactions. For example, Patent Document 1 discloses that a fluorinated polymer is reacted with a silicon compound having a secondary amino group and a silicon-bonded vinyl group to form a polymer terminated with a silicon-bonded vinyl group via an amide bond. Patent Document 2 describes that a perfluoropolyether based elastomer is reacted with a compound having Si—H groups. The hydrosilylation reaction product is useful in such applications as rubber materials, coating materials and parting agents. As a variation of hydrosilylation reaction, a polymer having a trialkoxysilyl group is obtainable. Also since a perfluoropolyether based elastomer undergoes hydrolysis in air in the presence of a tin or titanium catalyst, to form a siloxane bond with an alkoxysilane, it is utilizable as a room temperature curable coating material.

There is still a strong demand for the development of an alternative method for the terminal modification of fluoropolymers. Such demand is based on the increased demand for cured materials specialized for certain applications such as the use to unbeatable large-size parts and the use to less heat resistant parts. It is known that azide group-containing compounds undergo click reaction with alkynes at room temperature in the presence of copper ions, to form a 1,3-triazole skeleton. While there is a tendency that this skeleton is often introduced in a polymer as a partial structure, there are some examples like Patent Document 3 that employ the reaction as an elastomer crosslinking system. Also, the azide groups can be converted to various skeletons, for example, isocyanates or amines through hydride reduction or Curtius rearrangement, and cyclic amides through Boyer-Schmidt-Aube rearrangement. This means that terminally azido-modified fluoropolymers have a sufficient potential to meet the demand for an alternative method for the terminal modification of fluoropolymers.

Because of the usefulness of azide group-containing fluoropolymers, many structures are known from the literature including Patent Documents 4 and 5. However, an azide group-containing fluoropolymer having a perfluoropolyether group of specific molecular structure as the backbone structure as defined in the present invention is not known. On the other hand, the method for synthesizing an azide compound having an azide group at one end of the molecular chain from a low-molecular alcohol having a HFPO trimer as the backbone structure is known from Non-Patent Document 1.

CITATION LIST

Patent Document 1: JP 5356129 (U.S. Pat. No. 8,143,359)
Patent Document 2: JP 5246190 (U.S. Pat. No. 8,865,820)
Patent Document 3: JP-A 2008-522014 (U.S. Pat. No. 7,691,515)
Patent Document 4: JP 5635084 (U.S. Pat. No. 8,247,614)
Patent Document 5: JP-A 2012-500322 (U.S. Pat. No. 9,388,257)
Non-Patent Document 1: Collection of Czechoslovak Chemical Communications, 73 (12), 1799-1813, 2008

DISCLOSURE OF INVENTION

An object of the invention is to provide an azide group-containing fluoropolymer based on perfluoropolyether of specific molecular structure and having an azide group at both ends of the molecular chain via a methylene group, and a method for preparing the same.

The inventors have found that an azide group-containing fluoropolymer based on perfluoropolyether of specific molecular structure is quantitatively prepared by providing a fluoropolymer having a divalent perfluoropolyether group of specific molecular structure and capped with a hydroxymethyl group at both ends of the molecular chain, protecting the terminal hydroxyl group of the fluoropolymer with a sulfonyl ester group, to form a fluoropolymer having a sulfonyl ester group at both ends of the molecular chain via a methylene group, and reacting the fluoropolymer having a sulfonyl ester group with sodium azide in a mixture of a non-fluorinated organic solvent and a partially or fully fluorinated organic solvent.

Accordingly, the invention provides an azide group-containing fluoropolymer having the following general formula (1):

$$N_3—CH_2—Rf^1—CH_2—N_3 \quad (1)$$

wherein $Rf^1$ is a divalent perfluoropolyether group having one of the general formulae (2) to (5):

(2)

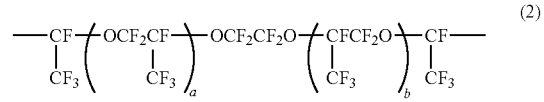

(3)

(4)

(5)

wherein a and b are each independently an integer in the range: $a \geq 1$, $b \geq 1$, $2 \leq a+b \leq 150$, and c is an integer of 1 to 150.

The invention also provides a method for preparing the azide group-containing fluoropolymer of formula (1), comprising the steps of:

reacting a fluoropolymer capped with a hydroxymethyl group at both ends of the molecular chain, having the following general formula (6):

$$HO—CH_2—Rf^1—CH_2—OH \quad (6)$$

wherein $Rf^1$ is as defined above with a halogenated sulfonyl compound, to form a fluoropolymer capped with a sulfonyl ester group at both ends of the molecular chain, and reacting the fluoropolymer capped with a sulfonyl ester group at both ends of the molecular chain with sodium azide in a mixture of a non-fluorinated organic solvent and a partially or fully fluorinated organic solvent.

Advantageous Effects of Invention

The azide group-containing fluoropolymer of specific molecular structure cannot be obtained by reacting a fluoropolymer capped with a hydroxymethyl group at both ends of the molecular chain with a halogenated sulfonyl compound and reacting the reaction product with sodium azide in a non-fluorinated organic solvent. This is because the rate of azide-forming reaction is low and side reactions take place due to the low solubility of the fluoropolymer in the non-fluorinated organic solvent. The azide group-containing fluoropolymer is obtainable by reacting the reaction product with sodium azide in a mixture of a non-fluorinated organic solvent and a partially or fully fluorinated organic solvent which is comparatively highly compatible with the fluoropolymer.

DESCRIPTION OF PREFERRED EMBODIMENTS

Figure 1:
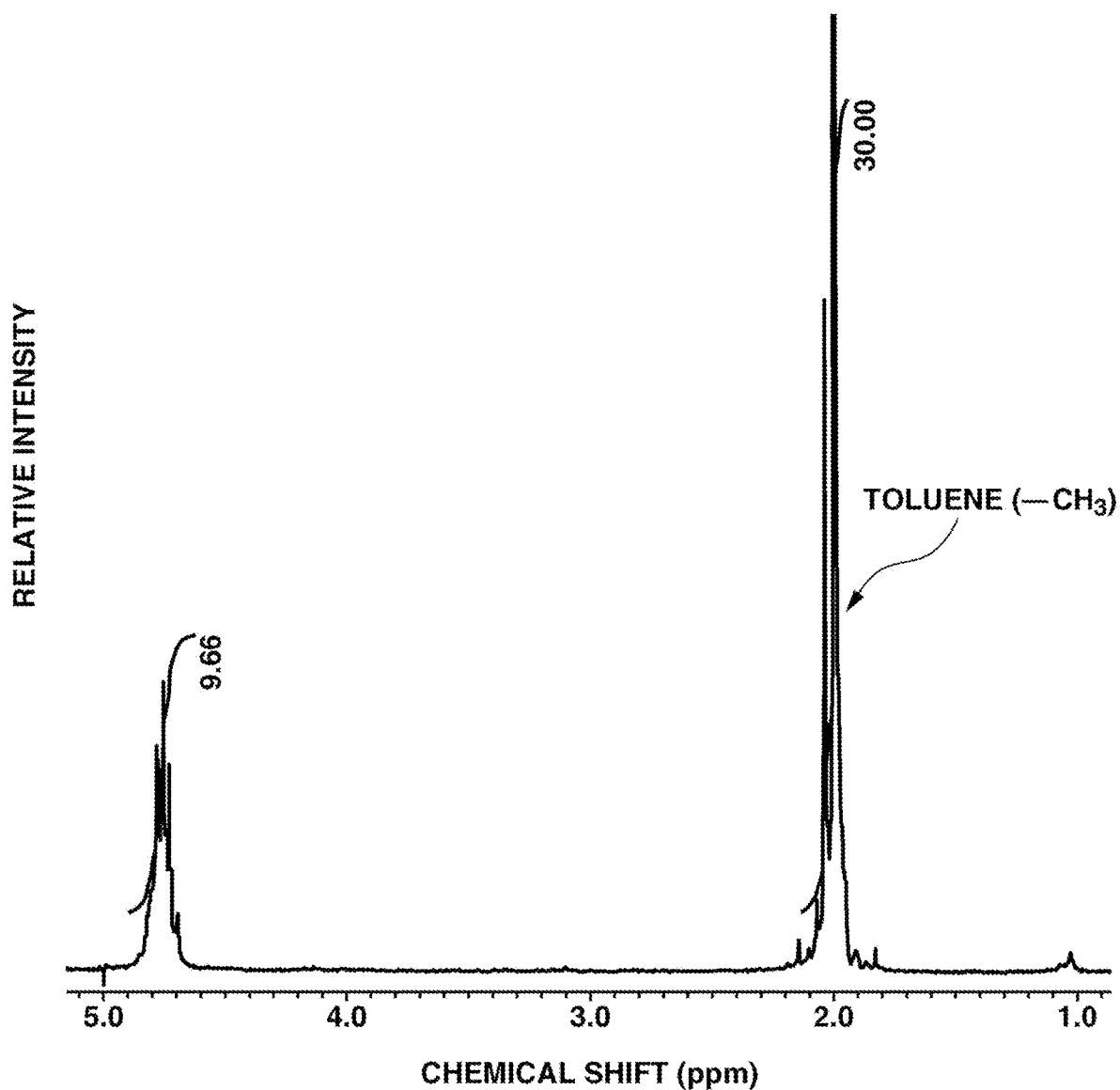
FIG. 1 is a diagram showing $^1$H-NMR spectrum of the fluoropolymer of formula (10) in Example 1.

One embodiment of the invention is an azide group-containing fluoropolymer having the following general formula (1).

$$N_3-CH_2-Rf^1-CH_2-N_3 \quad (1)$$

In formula (1), the backbone: $Rf^1$ is a divalent perfluoropolyether group having any one of the following general formulae (2) to (5).

(2)

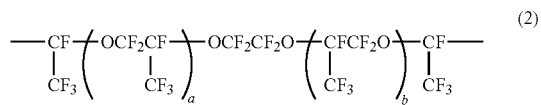

(3)

(4)

(5)

Herein a and b are each independently an integer in the range: a≥1, b≥1, 2≤a+b≤150, and c is an integer of 1 to 150. Preferably $Rf^1$ is a divalent perfluoropolyether group having formula (2) or (3).

In formulae (2) to (5), a, b and c are each independently an integer, a is a≥1, preferably 1≤a≤75, b is b≤1, preferably 1≤b≤75, and 2≤a+b≤150, preferably 6≤a+b≤100, and c is an integer of 1 to 150, preferably 5 to 100. As long as a+b is at least 2 and up to 150 and c is at least 1 and up to 150, desirably the operation following the reaction is easy.

Referring to the azide group-containing fluoropolymer having formula (1) wherein $Rf^1$ is a divalent perfluoropolyether group having formula (2) or (3) as a typical polymer, examples of the azide group-containing fluoropolymer having formula (1) are shown below, but not limited thereto.

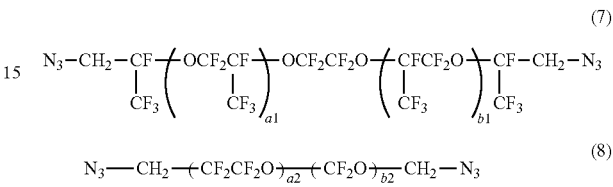

In formula (7), a1 and b1 are each independently an integer, a1≥1, b1≥1 and 2≤a1+b1≤150, preferably 6≤a1+b1≤120, more preferably 35≤a1+b1≤100. In formula (8), a2 and b2 are each independently an integer, a2≥1, b2≥1 and 2≤a2+b2≤150, preferably 6≤a2+b2≤100.

Another embodiment is a method for preparing the azide group-containing fluoropolymer represented by the general formula (1), comprising the steps of reacting a fluoropolymer capped with a hydroxymethyl group at both ends of the molecular chain, represented by the following general formula (6):

(6)

wherein $Rf^1$ is as defined above, at its hydroxyl groups, with a halogenated sulfonyl compound, to form a fluoropolymer capped with a sulfonyl ester group at both ends of the molecular chain, and reacting the sulfonyl ester-capped fluoropolymer at its sulfonyl ester groups with sodium azide in a mixture of a non-fluorinated organic solvent and a partially or fully fluorinated organic solvent.

Reference is now made to the azide group-containing fluoropolymer having formula (1) wherein $Rf^1$ is a divalent perfluoropolyether group having formula (2) as a typical example. The preparation of this fluoropolymer through the following first and second steps is described.

1st Step

In the first step, a fluoropolymer capped with a hydroxymethyl group at both ends of the molecular chain, for example, a fluoropolymer as shown below is reacted with a halogenated sulfonyl compound, for example, perfluoro-1-butanesulfonyl fluoride in the presence of a base (e.g., triethylamine) to convert the hydroxy group to a sulfonyl ester group to form a fluoropolymer having a sulfonyl ester group at both ends of the molecular chain via a methylene group, for example, a polymer having hexafluoropropylene oxide (HFPO) structure as the backbone as shown below.

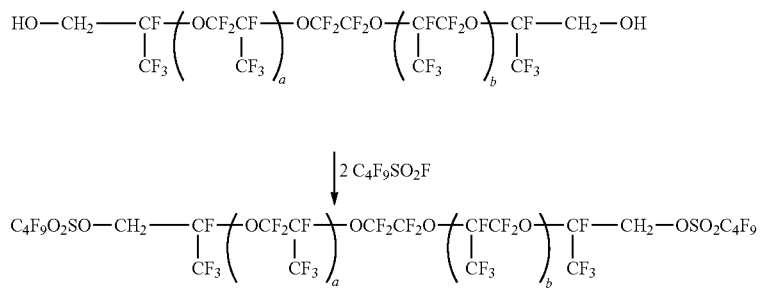

Herein a, b, and a+b are as defined above.

The method starts with a fluoropolymer capped with a hydroxymethyl group at both ends of the molecular chain. When a fluoropolymer capped with a hydroxymethyl group at both ends of the molecular chain and having a skeleton of formula (3), (4) or (5) as the backbone is used instead of the fluoropolymer having hexafluoropropylene oxide (HFPO) to structure as the backbone, represented by formula (2), there is obtained a sulfonyl ester polymer having the corresponding backbone structure.

In the reaction, the halogenated sulfonyl compound is preferably used in an amount of at least 1.0 equivalent, more preferably at least 1.0 equivalent and up to 5.0 equivalents per equivalent of hydroxyl group on the fluoropolymer capped with hydroxymethyl at both ends of the molecular chain. Suitable halogenated sulfonyl compounds include perfluoro-1-butanesulfonyl fluoride, p-toluenesulfonyl chloride, methanesulfonyl chloride, and p-nitrobenzenesulfonyl chloride.

The base such as triethylamine is added to the reaction system for the purpose of neutralizing the hydrogen halide which is formed during reaction of terminal hydroxyl groups on the fluoropolymer with the halogenated sulfonyl compound. The base is preferably used in an amount of at least 1.1 equivalents and up to 1.5 equivalents per equivalent of hydroxyl group on the fluoropolymer capped with hydroxymethyl at both ends of the molecular chain. Suitable bases include triethylamine, diisopropylethylamine, and pyridine.

The reaction is preferably performed in a nitrogen blanket. The reaction temperature may be of the order of 20 to 50° C., especially 20 to 40° C. Since the reaction is exothermic immediately after the start, the reaction system may be cooled for about 10 minutes from the start if the temperature elevates to a high level. Stirring is continued for 1 hour to 3 days, especially 3 hours to 24 hours from the start of reaction, after which the reaction is complete. After the completion of reaction, the triethylamine-hydrogen fluoride salt resulting from reaction is dissolved in water. The fluorinated organic solvent layer is collected and concentrated under reduced pressure, obtaining a fluoropolymer having a sulfonyl ester group at both ends of the molecular chain via methylene.

2nd Step

In the second step, the fluoropolymer having a sulfonyl ester group at both ends of the molecular chain via methylene, for example, a polymer having hexafluoropropylene oxide (HFPO) structure as the backbone, as shown below, is reacted at its sulfonyl ester groups with sodium azide in a mixture of a partially or fully fluorinated organic solvent and a non-fluorinated organic solvent, obtaining the desired azide group-containing fluoropolymer having an azide group at both ends of the molecular chain via methylene, represented by formula (1), for example, an azide group-containing fluoropolymer having hexafluoropropylene oxide (HFPO) structure as the backbone, as shown below.

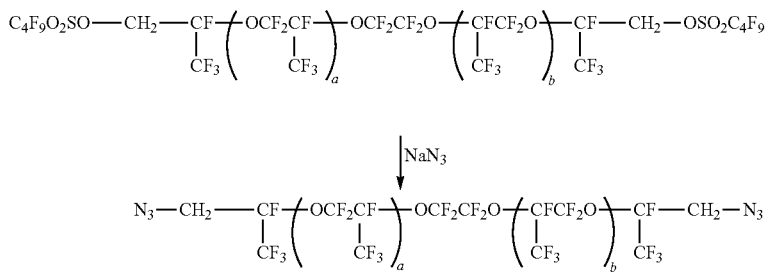

Herein a, b and a+b are as defined above.

In the reaction, the sodium azide is preferably used in an amount of at least 1.0 equivalent, more preferably at least 1.1 equivalents and up to 3.0 equivalents per equivalent of sulfonyl ester group on the fluoropolymer having a sulfonyl ester group. If the equivalent amount of the sodium azide is below the range, the reaction may not take place to an acceptable extent. If the equivalent amount of the sodium azide is above the range, an excess of the sodium azide is left in the system after the completion of reaction, with the risk of explosion during separatory operation.

Suitable non-fluorinated organic solvents include dimethyl sulfoxide (DMSO), N,N-dimethylformamide (DMF) and acetonitrile. The non-fluorinated organic solvent is preferably used in an amount of at least 0.5 time, more preferably at least 1.5 times and up to 2.5 times the weight of the fluoropolymer having a sulfonyl ester group at both ends of the molecular chain via methylene. If the amount of the non-fluorinated organic solvent is below the range, the reaction rate may become lower and side reaction may take place.

As used herein, the term "partially fluorinated" should be understood to mean that only some of the hydrogen atoms on the backbone are replaced by fluorine. The term "fully fluorinated" should be understood to mean that all hydrogen atoms on the backbone are replaced by fluorine atoms. Sometimes, the partially or fully fluorinated organic solvent is simply referred to as "fluorinated organic solvent."

Examples of the fluorinated organic solvent include hexafluoro-m-xylene (HFMX), H Galden ZV130 (Solvay), AC-6000 (AGC Inc.), and other solvents in which the fluoropolymer having a sulfonyl ester group is dissolved. The fluorinated organic solvent is preferably used in an amount of at least 0.5 time, more preferably at least 1.5 times and up to 2.5 times the weight of the fluoropolymer having a sulfonyl ester group at both ends of the molecular chain via methylene. If the amount of the fluorinated organic solvent is below the range, the reaction rate may become lower and side reactions may take place.

The fluorinated organic solvent and the non-fluorinated organic solvent are preferably used in a weight ratio of from 0.5:1 to 3:1, more preferably from 1:1 to 2:1, most preferably 1:1. If the ratio of the fluorinated organic solvent is too low, the rate of azide-forming reaction may become lower and side reactions may take place. If the ratio of the fluorinated organic solvent is too high, the rate of azide-forming reaction may become lower and side reactions may take place.

The reaction may be performed by adding a fluorinated organic solvent, a non-fluorinated organic solvent, and sodium azide to the fluoropolymer having a sulfonyl ester group at both ends of the molecular chain via methylene, and heating the mixture at a temperature of 60 to 120° C., especially 80 to 115° C. for 12 hours to 3 days, especially 1 to 2.8 days. After the completion of reaction, water and a fluorinated organic solvent such as hexafluoro-m-xylene (HFMX) are added to the reaction mixture, from which a water layer is removed by separatory operation. Another organic solvent such as acetone is added to the solvent layer for precipitation. The precipitate is collected, concentrated under reduced pressure, and treated with activated carbon, obtaining the desired compound, fluoropolymer having an azide group at both ends of the molecular chain via methylene, represented by formula (1).

EXAMPLE

Examples are given below by way of illustration and not by way of limitation. The number of repetition of perfluorooxyalkylene units (or degree of polymerization) is a number average degree of polymerization as analyzed by gel permeation chromatography (GPC) using a fluorinated solvent as eluent.

Example 1

A 3-L flask was charged with 1,045 g of a fluoropolymer of HFPO (35-mer) skeleton backbone and having hydroxymethyl at both ends of the molecular chain, represented by the formula (9) (hydroxy group concentration=$0.30\times10^{-3}$ mol/g).

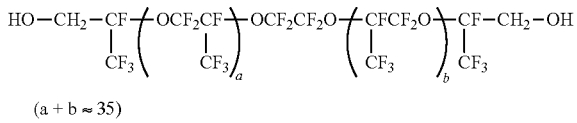

(a + b ≈ 35)

To the flask under nitrogen blanket, 389 g of perfluoro-1-butanesulfonyl fluoride and 46 g of triethylamine were added whereupon stirring was started. At this point, the internal temperature elevated to 30° C. at maximum. After stirring for about 20 hours, HFMX and water were added whereupon the HFMX layer was collected by separatory operation. Acetone was added to the layer for precipitation. The precipitate was collected and concentrated in vacuum (267 Pa, 100° C.) for 1 hour. As a result, 1,128 g of a fluoropolymer having the formula (10) was obtained as a colorless transparent mass.

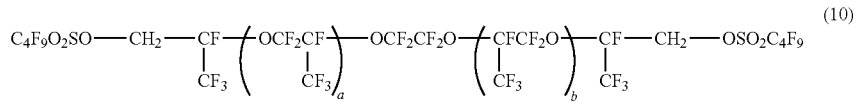

(a + b ≈ 35)

The fluoropolymer of formula (10), 1.0105 g, was mixed with 0.0535 g of toluene and 4.0084 g of hexafluoro-m-xylene (HFMX). The resulting solution was analyzed by $^1$H-NMR spectroscopy. On calculation, the fluoropolymer of formula (10) had a —OSO$_2$C$_4$F$_9$ value of $0.278\times10^{-3}$ mol/g. FIG. 1 shows the $^1$H-NMR spectrum.

$^1$H-NMR δ 4.69 (m, —CH$_2$)

A 10-L flask was charged with 1,128 g of the fluoropolymer having formula (10) and 1,692 g of DMSO, which were purged with nitrogen for 10 minutes. Under the nitrogen blanket, the flask was further charged with 1,692 g of HFMX and 60 g of sodium azide, and heated at an internal temperature of 110° C., whereupon stirring was started. After 66.5 hours of stirring, water was added to quench the reaction, and HFMX was added. By separatory operation, the HFMX layer was recovered. Acetone was added to the HFMX layer for precipitation. The precipitate was collected, filtered and concentrated in vacuum (267 Pa, 100° C.) for about 1 hour. To the concentrate, 1,018 g of PF5060 (3M) and 51 g of activated carbon (Shirasagi AS, Osaka Gas Chemicals Co., Ltd.) were added. The mixture was stirred at room temperature for 1 hour. After removal of the activated carbon by filtration, the filtrate was concentrated in vacuum (267 Pa, 100° C.) for about 1 hour. There was obtained 960 g of an azide group-containing fluoropolymer having the formula (11) as a colorless transparent mass.

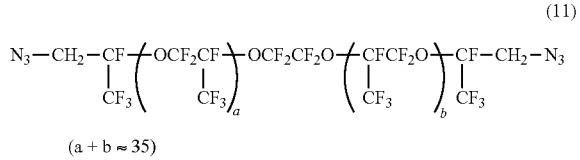

(11)

(a + b ≈ 35)

Figure 2:
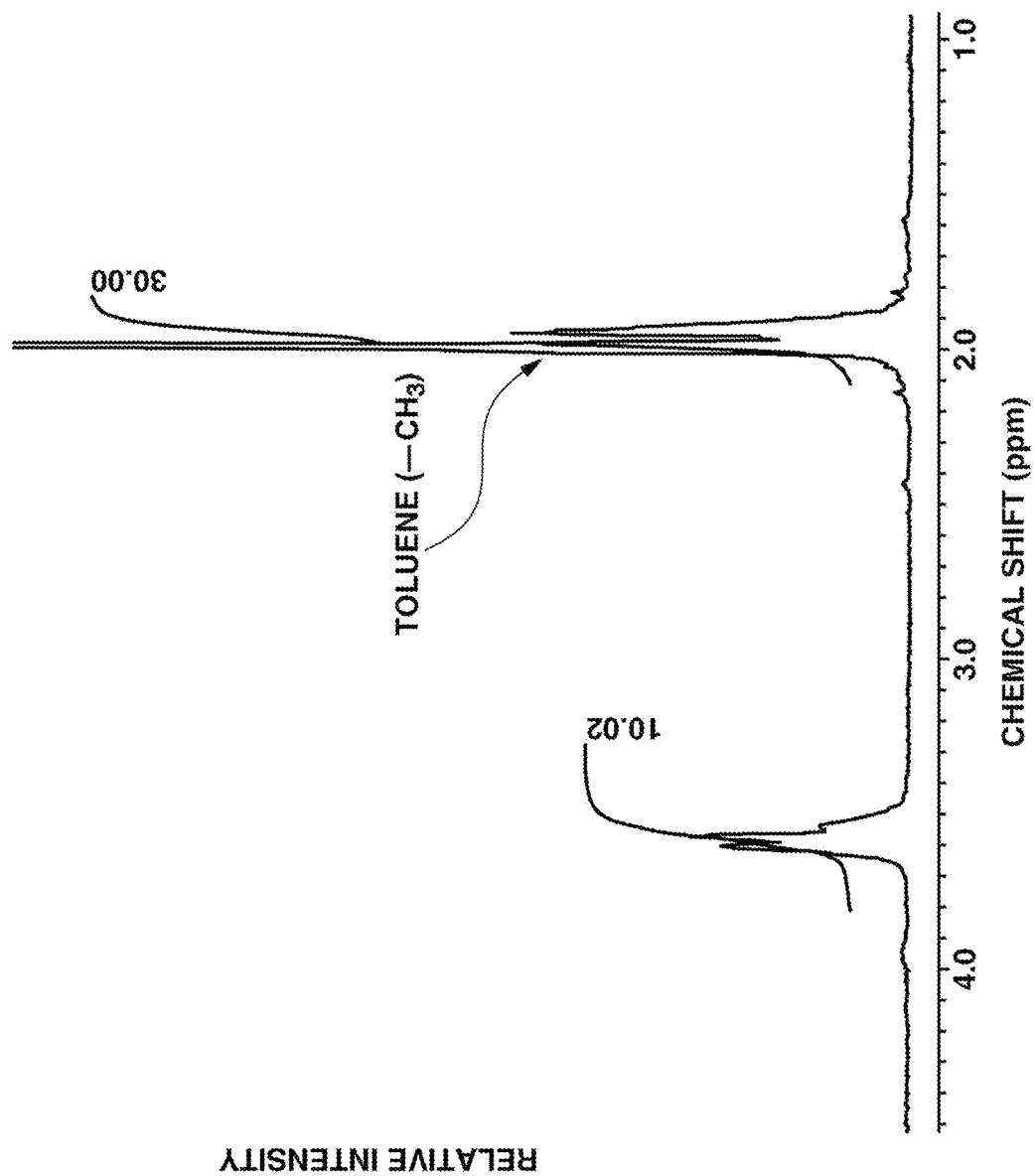
FIG. 2 is a diagram showing $^1$H-NMR spectrum of the fluoropolymer of formula (11) in Example 1.

The azide group-containing fluoropolymer having formula (11), 1.0083 g, was mixed with 0.0508 g of toluene and 4.0031 g of hexafluoro-m-xylene (HFMX). The resulting solution was analyzed by $^1$H-NMR spectroscopy. On calculation, the fluoropolymer of formula (11) had an azide value of $0.274 \times 10^{-3}$ mol/g. FIG. 2 shows the $^1$H-NMR spectrum.

$^1$H-NMR δ 3.56 (m, —CH$_2$)

Comparative Example 1

A 100-mL flask was charged with 20 g of a fluoropolymer of HFPO (35-mer) skeleton backbone and having hydroxymethyl at both ends of the molecular chain, to represented by the above formula (9) (hydroxy group concentration=$0.30 \times 10^{-3}$ mol/g). To the flask under nitrogen blanket, 7.6 g of perfluoro-1-butanesulfonyl fluoride and 0.85 g of triethylamine were added whereupon stirring was started. After stirring for about 3 days, HFMX and water were added whereupon the HFMX layer was collected by separatory operation. Acetone was added to the layer for precipitation. The precipitate was collected and concentrated in vacuum (267 Pa, 100° C.) for 1 hour. There was obtained 17 g of a fluoropolymer having the above formula (10) as a colorless transparent mass.

On calculation by the same method as above, the fluoropolymer had a —OSO$_2$C$_4$F$_9$ value of $0.281 \times 10^{-3}$ mol/g.

Figure 3:
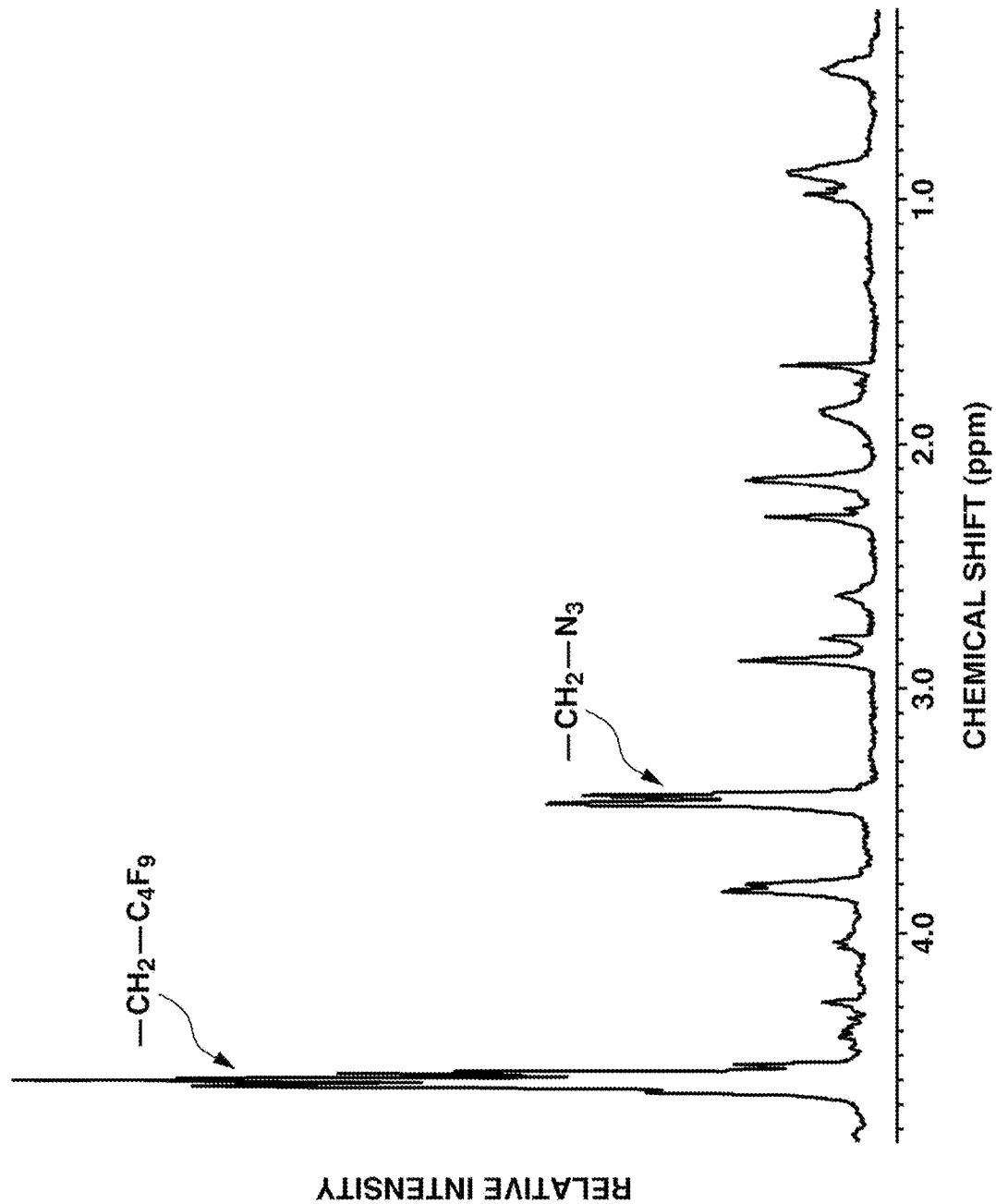
FIG. 3 is a diagram showing $^1$H-NMR spectrum of the product in Comparative Example 1.

A 100-mL flask was purged with nitrogen and charged with 10 g of the fluoropolymer having formula (10) and 30 g of DMSO, which were allowed to stand for 10 minutes. Under the nitrogen blanket, the flask was further charged with 0.55 g of sodium azide and heated at an internal temperature of 110° C., whereupon stirring was started. After 45.5 hours of stirring, water was added to quench the reaction, and HFMX was added. By separatory operation, the HFMX layer was recovered. Acetone was added to the HFMX layer for precipitation. The precipitate was collected and concentrated in vacuum (267 Pa, 100° C.) for about 1 hour. There was obtained a complex mixture of compounds, but not the azide group-containing fluoropolymer having the above formula (11). FIG. 3 shows the $^1$H-NMR spectrum of the mixture.

INDUSTRIAL APPLICABILITY

The azide group-containing fluoropolymer of the invention is useful in crosslinking using 1,3-dipolar cycloaddition, for example, Huisgen cycloaddition reaction between an azide and an alkyne, and especially useful as a base polymer for fluorinated elastomers. The resulting elastomers find use as parts requiring chemical resistance and oil resistance in various fields including automobiles, chemical plants, automatic business machines (e.g., copiers and ink jet printers), semiconductor manufacture lines, analytical and scientific instruments, medical instruments, aircraft, and fuel cells. Exemplary parts include rubber moldings such as diaphragms, valves, sealing parts (e.g., O-rings, oil seals, packings, to gaskets, joints and face seals), gel materials, adhesives, (sensor) potting materials, tent coating materials, sealants, molded parts, extruded parts, coatings, copier roll materials, electrical moisture-proof coatings, laminate rubber fabrics, protective materials for automobile pressure sensors, and materials for the protection and vibration-damping of automobile-mounted electronic parts. There is a possibility that the azide-containing fluoropolymer finds use in a variety of other applications after functionality modification.

Japanese Patent Application No. 2017-232578 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An azide group-containing fluoropolymer having the following general formula (1):

$$N_3—CH_2—Rf^1—CH_2—N_3 \qquad (1)$$

wherein $Rf^1$ is a divalent perfluoropolyether group having the following general formula (2):

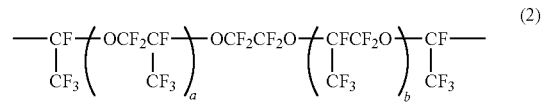

wherein a and b are each independently an integer in the range: a≥1, b≥1, 2≤a+b≤150.

2. A method for preparing the azide group-containing fluoropolymer of claim 1, comprising the steps of:
    reacting a fluoropolymer capped with a hydroxymethyl group at both ends of the molecular chain, having the following general formula (6):

$$HO—CH_2—Rf^1—CH_2—OH \qquad (6)$$

wherein $Rf^1$ is as defined above with a halogenated sulfonyl compound, to form a fluoropolymer capped with a sulfonyl ester group at both ends of the molecular chain, and
    reacting the fluoropolymer capped with a sulfonyl ester group at both ends of the molecular chain with sodium azide in a mixture of a non-fluorinated organic solvent and a partially or fully fluorinated organic solvent.

* * * * *